(12) United States Patent
Butler, III et al.

(10) Patent No.: US 6,394,660 B1
(45) Date of Patent: May 28, 2002

(54) THRUST BEARING ASSEMBLY

(75) Inventors: Edward P. Butler, III, Torrington; Matthew Urmaza, New Hartford, both of CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/672,213

(22) Filed: Sep. 28, 2000

(51) Int. Cl.$^7$ ................................................ F16C 33/58
(52) U.S. Cl. ...................... 384/620; 384/622; 384/906
(58) Field of Search ...................... 384/620, 622, 384/906, 621, 615

(56) References Cited

U.S. PATENT DOCUMENTS

| 3,957,325 A | 5/1976 | Babb |
|---|---|---|
| 3,999,816 A | 12/1976 | Pitner |
| 4,042,285 A | 8/1977 | Dorsch |
| 4,166,662 A | 9/1979 | Chiba et al. |
| 4,783,183 A | 11/1988 | Gardella |
| 4,981,373 A | 1/1991 | Bando |
| 5,007,746 A | 4/1991 | Matzelle et al. |
| RE34,813 E | 12/1994 | Gardella |
| 5,511,885 A | 4/1996 | Coleman |

Primary Examiner—Lenard A. Footland
(74) Attorney, Agent, or Firm—John C. Bigler

(57) ABSTRACT

Inner and outer thrust washers are separated by rollers in rolling contact with the inner and outer thrust washers. Two tabs extend radially from the raceway of one of the inner and outer thrust washers. The two tabs have different configurations and are distributed circumferentially at less than 180 degrees separation.

4 Claims, 2 Drawing Sheets

THRUST BEARING ASSEMBLY

BACKGROUND OF THE INVENTION

This invention relates generally to thrust bearings and, more particularly, to thrust bearings with anti-reversal and anti-rotation features.

Thrust bearings are in general use in transmissions and similar devices to support axial load between components. For example, thrust bearings are used in automotive torque converters to position and support a stator. To function correctly, the thrust bearing must be oriented with a specific face against the stator or other housing and must be seated so that it doesn't rotate or spin with respect to the stator or housing.

Typically, such thrust bearings are painted with a stripe to indicate the face of the thrust bearing that is to face outward from the stator, and the thrust bearing is pressed into a recess of the stator so that relative rotation is reduced. However, problems sometimes occur due to inadvertent improper orientation of the thrust bearing or due to wear associated with relative rotation of the thrust bearing and the stator.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a thrust bearing assembly comprising an inner thrust washer having an inner raceway, an outer thrust washer having an outer raceway, and rollers separating and in rolling contact with the inner and outer thrust washers. Two tabs extend radially from the raceway of one of the inner and outer thrust washers. The two tabs have different configurations and are distributed circumferentially at less than 180 degrees separation.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
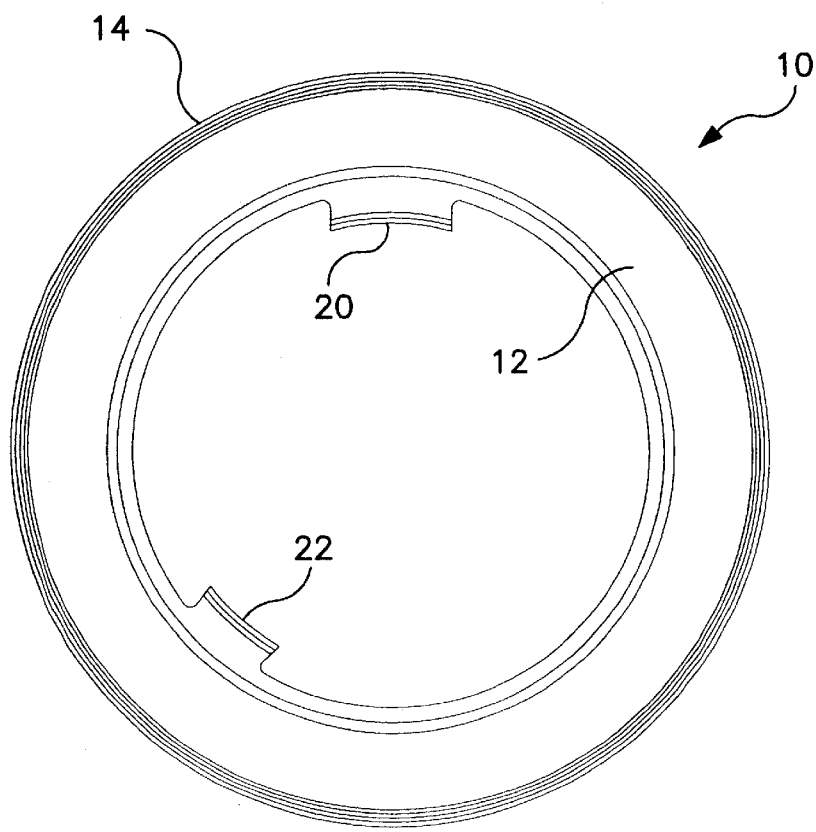
FIG. 1 is an end view of a thrust bearing assembly illustrating the present invention.
Figure 2:
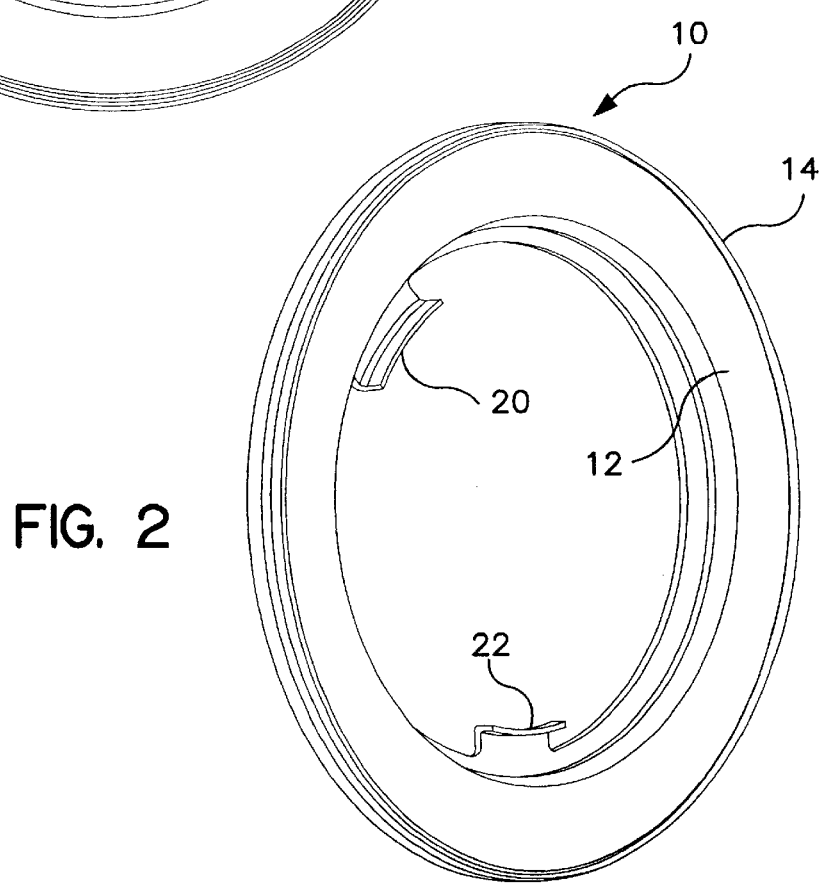
FIG. 2 is a pictorial view of the thrust bearing assembly of FIG. 1.
Figure 3:
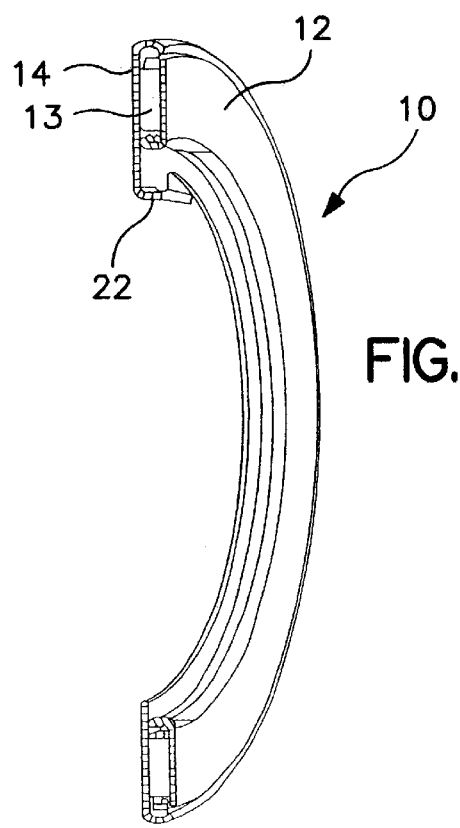
FIG. 3 is a cross sectional view of the thrust bearing assembly of FIG. 1.
Figure 4:
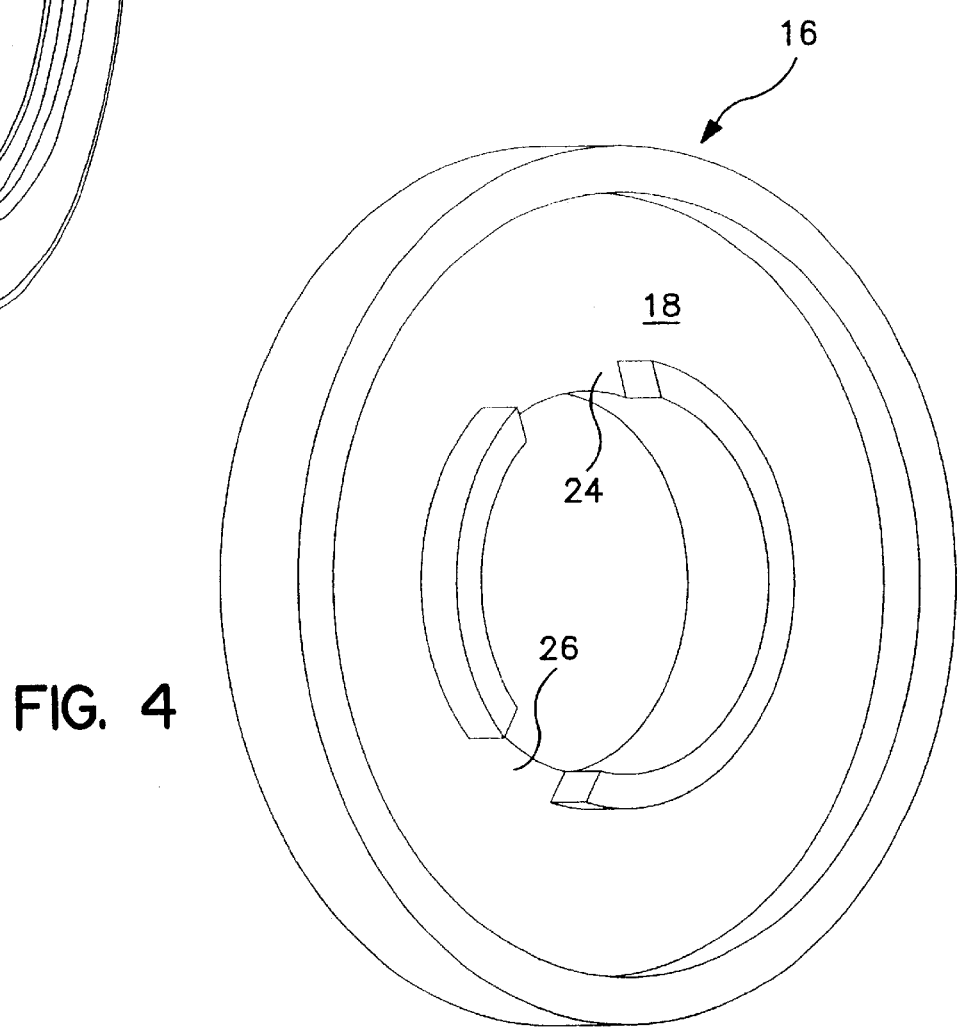
FIG. 4 is a pictorial view of a stator illustrating a housing for use with the thrust bearing of FIG. 1.

Referring now to the drawings, FIGS. 1 and 2 illustrate a thrust bearing 10 with an inner thrust washer 12 and outer thrust washer 14 that are separated by needle rollers 13 that roll on inner and outer races of the inner and outer thrust washers, respectively. Similar thrust bearings, without anti-reversal or anti-rotation features, are well known.

In the illustrated embodiment, the thrust washer assembly 10 is to be mounted against a housing 16, within circumferential recess 18. To ensure that outer thrust washer 14 does not rotate relative to the housing 16, thrust washer 14 has two tabs 20 and 22 that extend radially into corresponding radial recesses 24 and 26. The tabs 20 and 22 may be formed by extending a portion of the outer raceway radially inwardly and then bending that portion axially toward the outer raceway, as illustrated, or may be formed by other means.

Significantly, the two tabs 20 and 22 are of different configuration (size or shape). In the illustrated embodiment, tab 20 extends further in the circumferential direction than does tab 22. Radial recess 26 corresponds in size and shape to tab 22 and is smaller than tab 20 such that tab 20 will not fit therein. Alternatively, tab 20 could be larger in the radial direction or could merely have a different shape such that tab 20 will not fit into corresponding radial recess 24.

Tabs 20 and 22 are positioned asymmetrically; that is, the two tabs are distributed circumferentially at less than 180 degrees separation. Because the two tabs are not diametrically opposed, and because tab 20 can only be positioned in radial recess 26, the two tabs prevent thrust bearing assembly 10 from being installed in a reversed direction with the wrong face or thrust washer against the housing. Thus, only outer thrust washer 14 can be installed against housing 16.

Alternatively, a thrust bearing assembly could be designed for mounting an inner thrust washer against a housing and also utilize the present invention. In that case, two asymmetrical tabs of different configuration (size or shape) would extend radially outwardly from the inner thrust washer to engage corresponding recesses in the housing.

From the above description, it will be apparent that the present invention provides a simple means of ensuring that a thrust bearing is positioned with proper orientation with respect to a housing and that the thrust bearing will not rotate relative to the housing after it is installed. This invention is particularly suitable for applications in automotive transmissions and torque converters.

Having described the invention, what is claimed is:

1. A thrust bearing assembly comprising:
   an inner thrust washer having an inner raceway;
   an outer thrust washer having an outer raceway;
   rollers separating and in rolling contact with the inner and outer thrust washers; and
   two tabs extending radially from the raceway of one of the inner and outer thrust washers, the two tabs having different configurations and being distributed circumferentially at less than 180 degrees separation.

2. A thrust bearing assembly according to claim 1, wherein the two tabs extend radially from the raceway of the outer raceway.

3. A thrust bearing assembly according to claim 1, wherein one of the two tabs extends further in the circumferential direction than the other of the two tabs.

4. A thrust bearing assembly according to claim 1, wherein the two tabs extend radially from the raceway of the outer raceway and are bent axially toward the inner raceway.

* * * * *